United States Patent [19]

Nelson

[11] Patent Number: 5,395,072
[45] Date of Patent: Mar. 7, 1995

[54] PROPELLANT TANK CONFORMAL LIFTING BODY SPACECRAFT

[76] Inventor: Robert L. Nelson, 26005 Todd La., Los Altos Hills, Calif. 94022

[21] Appl. No.: 72,699

[22] Filed: Jun. 7, 1993

Related U.S. Application Data

[63] Continuation of Ser. No. 779,867, Oct. 21, 1991, abandoned.

[51] Int. Cl.$^6$ ............................ B64C 1/00; B64G 1/14; B64G 1/62
[52] U.S. Cl. .................................... 244/36; 244/160; 244/119
[58] Field of Search ................... 244/158, 160, 117 R, 244/119, 36, 73, 74

[56] References Cited

U.S. PATENT DOCUMENTS

| | | | |
|---|---|---|---|
| D. 211,915 | 8/1968 | Raymes | 244/160 |
| 2,967,034 | 1/1961 | Eyre | 244/36 |
| 2,998,947 | 9/1961 | Griffith | 244/117 R |
| 3,096,049 | 7/1963 | Karasinski | 244/74 |
| 3,118,024 | 6/1965 | Schneider | 244/74 |
| 3,203,650 | 8/1965 | Christenson | 244/73 R |
| 3,261,571 | 7/1966 | Pinnes | 244/74 |
| 3,276,722 | 10/1966 | Eggers, Jr. et al. | 244/36 |
| 3,358,947 | 12/1967 | Bowyer, Jr. et al. | 244/73 R |
| 3,535,882 | 10/1970 | Tizio et al. | 244/73 R |
| 4,623,106 | 11/1986 | Price, Jr. et al. | 244/160 |
| 4,802,639 | 2/1989 | Hardy et al. | 244/160 |
| 4,817,890 | 4/1989 | Coffinberry | 244/73 R |
| 4,817,892 | 4/1989 | Janeke | 244/74 |
| 5,090,642 | 2/1992 | Salkeld | 244/158 R |

FOREIGN PATENT DOCUMENTS 1421357  11/1965  France ............... 244/73 R

OTHER PUBLICATIONS

"Langley Refines Design Begins Human Factors Tests of Personnel Launch System", Edward H. Phillips, Aviation Week and Space Technology, Jul. 15, 1991 pp. 52-53.

"Company Formed to Manage Next Phase of Europe's Hermes Spaceplane Program", Jeffrey M. Lenorovitz, Aviation Week and Space Technology, Nov. 12, 1990, p. 76.

Space Agency Considers Doubling Size of Hope Unmanned Space Vehicle Tsukuba Science City, Japan. Aviation Week and Space Technology. Aug. 13, 1990 pp. 65-67.

"Single Stage to Orbit Counting Dawn", Payton, Aerespace America, Apr. 1991 pp. 38-39.

"Rockwell Enlists Boeing, Aerojet IN SPI Single-Stage Spacecraft Bid", Aviation Week and Space Technology Jun. 29, 1991 p. 61.

New Hotol Version Emerges Following British/Soviet Study. Lenorovitz/Zhukovski, USSR, Aviation Week and Space Technology/ Sep. 9, 1991.

"Space Flight", Flight International, 8 Jul. 1965 pp. 70-71.

Aviation Week, "Missile Engineering", Nov. 26, 1956 p. 51.

Primary Examiner—Michael S. Huppert
Assistant Examiner—Virna Lissi Mojica

[57] ABSTRACT

A lifting body concept applicable to reusable space launch vehicles in which the propellant tankage is shaped in the form of a closed "vee" made up of intersecting cylindrical segments, and represents a major part of both the structural and aerodynamic configurations. The lifting body is made up of conical, wedge and swept cylinder elements. Absence of wings and large vertical stabilizing surfaces together with a configuration made up of joined straight line element surfaces makes for a low-cost, efficient, lightweight airframe/propellant tank configuration. The windward afterbody composed of flat and fixed radius cylindrical surfaces makes possible a small number of ceramic and/or metallic heat shield tiles and contributes to their easy installation and replacement.

19 Claims, 4 Drawing Sheets

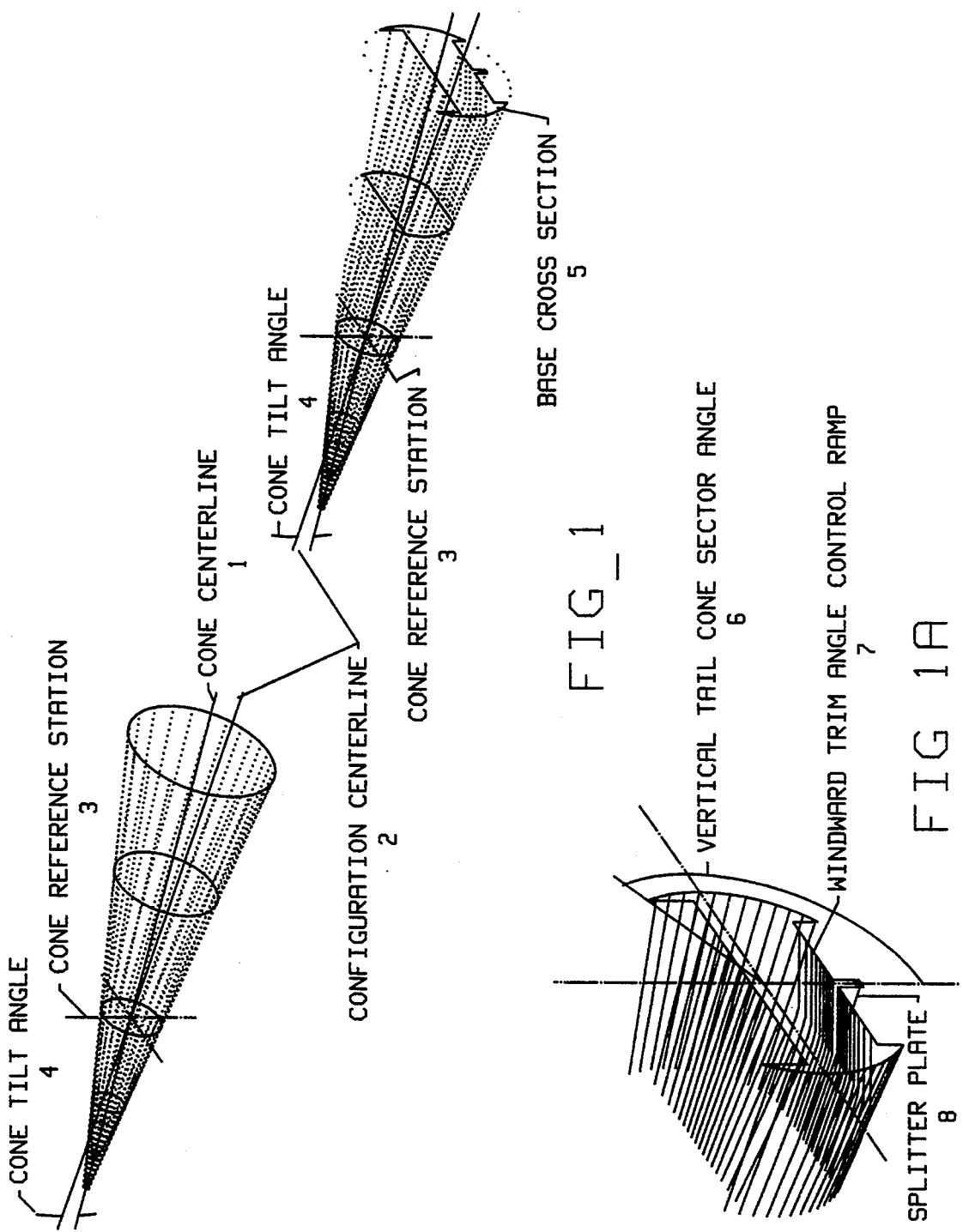

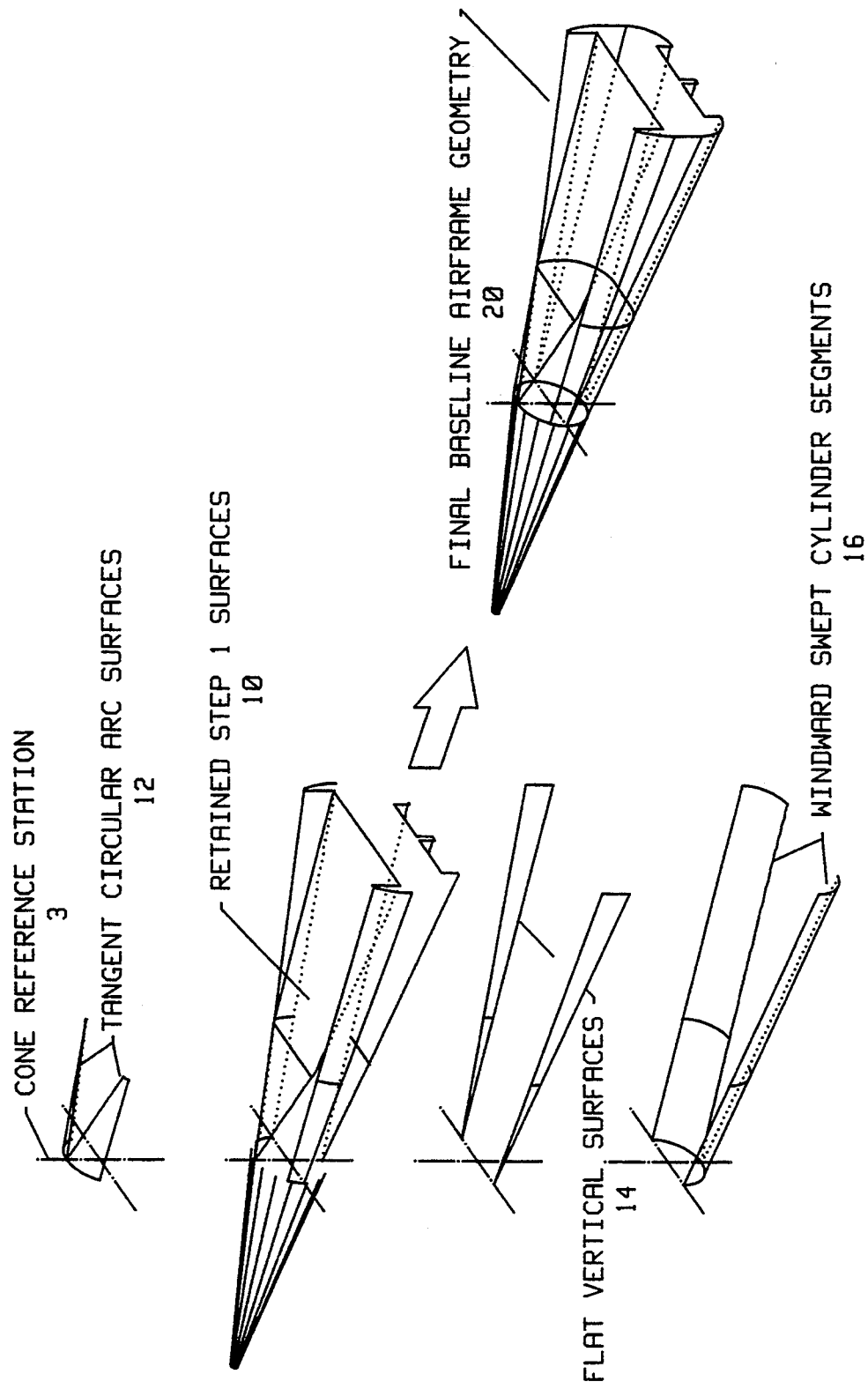
FIG_2

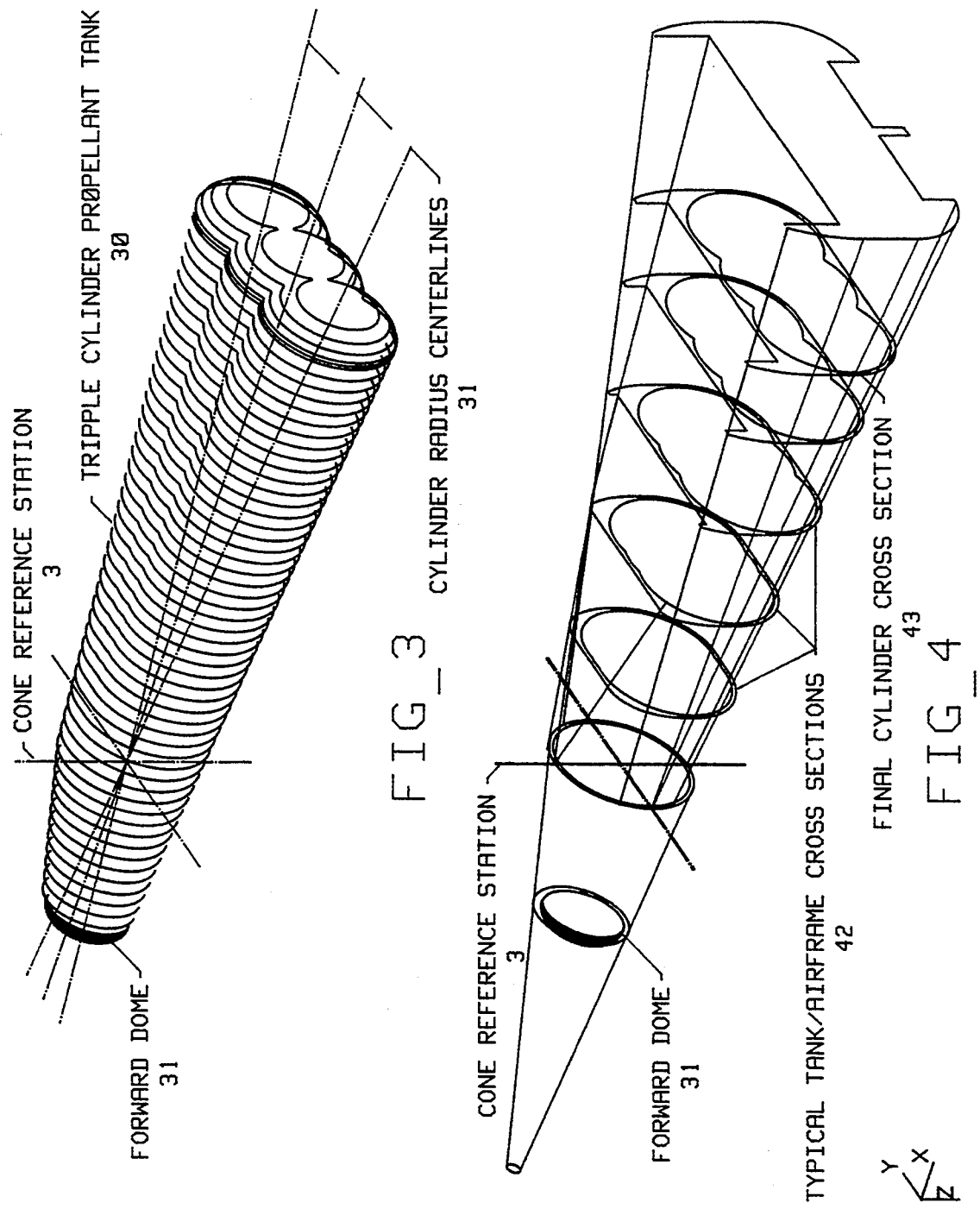

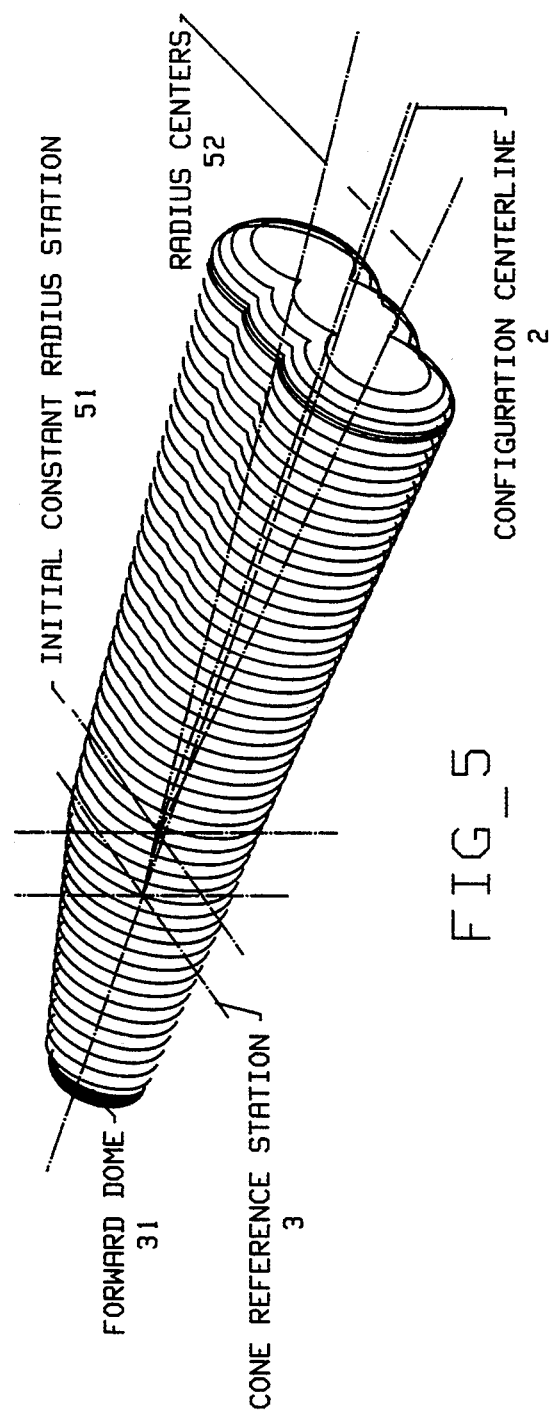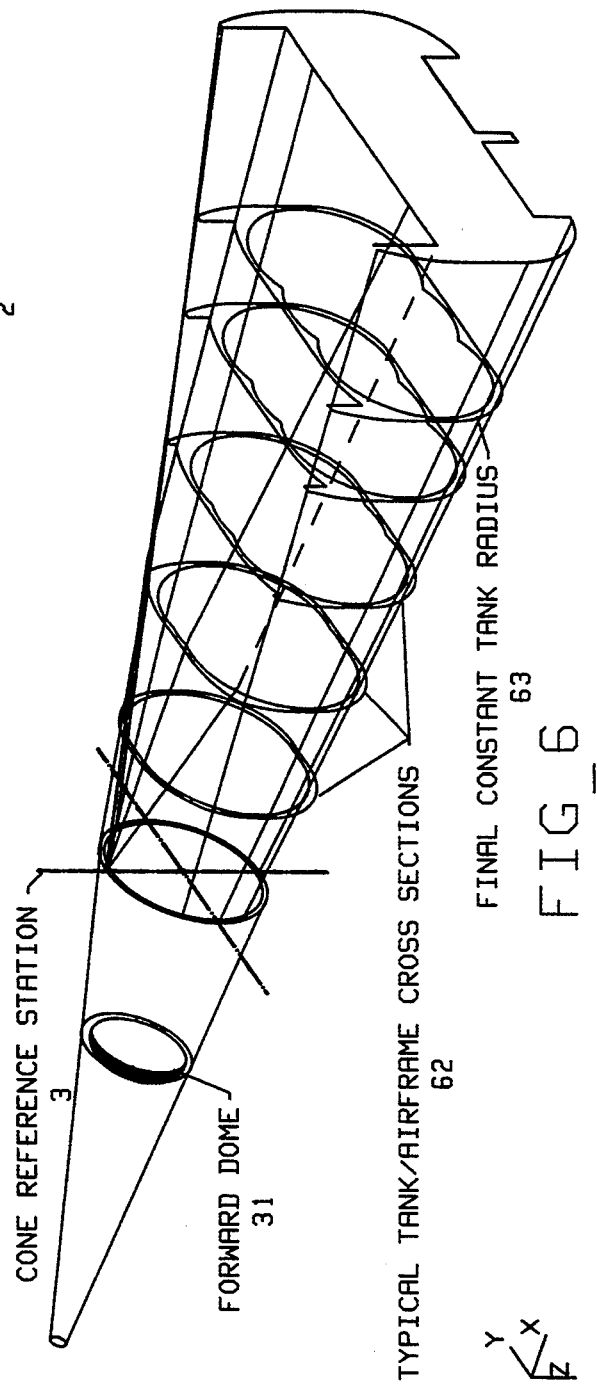

PROPELLANT TANK CONFORMAL LIFTING BODY SPACECRAFT

This is a continuation of Ser. No. 07/779,367, now abandoned, filed Oct. 21, 1991.

BACKGROUND OF THE INVENTION

The lack of low cost access to orbit is the greatest single detriment to the near-term exploitation of space. The attempt to achieve orbital payload delivery for substantially less than $5,000/lb. (a representative figure for expended boosters) has yet to be realized. The attempt to lower the cost with the partially reusable NASA space shuttle was never realized primarily due to flaws in system architecture. This invention relates to the invention of a near-single-stage-to-orbit configuration specially tailored to deliver payloads efficiently to orbit and return the vehicle to earth while still providing an impressive payload weight to orbit and without resorting to large expendable propellant tankage or large staged boosters. Numerous attempts have been made since the first orbital flight (Sputnik) to provide designs that possess these capabilities. The most notable current activity is the National Aerospace Plane Project which would rely on technology advances in structural and heat shielding materials and air-breathing propulsion. For the horizontal takeoff mode specified the payload delivered to orbit is subject to question.

Numerous design studies for the pure rocket mode to orbit have been sponsored by the U.S. Government including horizontal and vertical ground-launch, air-launch, single-stage and dual-stage options. All have demonstrated insufficient cost leverage to move forward following the conceptual design. For the dual stage mode, the cost of concurrent development of two large hypersonic vehicles proved to be a major stumbling block. For the single-stage or near single-stage vehicle approach, the study results to date have been similarly disappointing. Vehicles are large with small payloads delivered to orbit.

The dilemma facing the reusable single-stage chemical rocket space-launch vehicle designer is illustrated in a relationship derived from the rocket equation:

$$\Delta V = g \times \text{Isp} \times \log (W_{initial}/W_{final})$$

Assuming $\Delta V$ (including all losses)=29,000 feet/sec., vacuum Isp=460 sec. for a LOX-Hydrogen engine, and a fixed payload weight=10,000 lbs., the following relationship for the launch weight results:

$$W_{launch} = 70,000 \times \frac{(W_{propellant}/W_{empty})}{(W_{propellant}/W_{empty}-6)}$$

For a propellant to empty spacecraft weight ratio=6, there is no solution. For the ratio=7, the launch weight=490,000 lbs. Decreasing the ratio to 6.5 (a 7 percent change) nearly doubles the launch weight to 900,000 lbs. Since LOX-Hydrogen propellant has a density on the order of 20 lbs./cu.ft., the space launch vehicle is in effect a flying-recoverable propellant tank making it extremely difficult to achieve a propellant to empty weight ratio in the range providing some assurance that low cost access to space can be achieved. Heretofore, configuration designs having horizontal landing capability have either employed wings (heavy) or are modifications of earlier tested shapes configured for a different application. None have made the propellant tankage an integral part of the lifting body aerodynamic design.

SUMMARY OF THE INVENTION

It is the object of the present invention to reduce substantially the cost of delivery of payloads to orbit.

Another objective is to reduce the refurbishment cost and turnaround time for follow-on launches.

A further objective is to minimize development and production costs by employing simple straightforward configuration geometry.

Another objective is to provide for near-term go-ahead by employing flight-proven technology to minimize the needs for advanced technology.

These and other objects are provided through the utilization of a unique lifting body aerodynamic configuration (no wings) specifically tailored to accommodate and employ structurally the propellant tankage. The cylindrical propellant tankage elements are arranged in the form of a slender horizontal "vee" and thus conform to the delta planform of the lifting body. The body cross section has been chosen so as to minimize the size of vertical tail surfaces. Except for the case of horizontal takeoff from the ground, the airframe has adequate lift for all phases of flight. The configuration is expected to be stable or near neutrally stable, and trimmable at all flight Mach numbers and angles of attack for an aft center of gravity in the vicinity of $\frac{2}{3}$ of the delta length from its apex. This assessment is based on extensive wind tunnel tests and predictions for a similar configuration. Because the configuration has straightforward geometry and represents a near minimum envelope (minimum empty weight) design for a reusable space launch vehicle, it should provide the performance necessary to meet the stated objectives.

BRIEF DESCRIPTIONS OF THE DRAWINGS

FIG. 1 and 1A show the first step in the derivation of the airframe configuration from a cone. (Step 1 configuration)

FIG. 2 shows how the Step 1 configuration is modified to enhance the space launch vehicle application.

FIG. 3 shows a typical propellant tankage configuration that can be accommodated within the airframe envelope.

FIG. 4 shows representative airframe/tankage cross sections located within the airframe envelope.

FIG. 5 illustrates an extension of the propellant tank concept so as to increase the tank capacity without exceeding overall airframe configuration dimensions.

FIG. 6 shows the effect of the larger tank configuration on airframe/tank cross sections.

DESCRIPTION OF THE PREFERRED EMBODIMENT

Referring now to the drawings and in particular to FIG. 1, consider a slightly elliptical cone whose cone centerline is tilted down slightly with respect to the configuration centerline 2. The configuration centerline 2 passes through the center of the cone cross section at the cone reference station 3. The cone is slightly elliptical so that body cross sections perpendicular to the configuration centerline 2 are circular. A lifting body is formed by removing upper and lower portions of the cone. In the first step in deriving the configuration of this invention, the windward (bottom) portion is formed by removing that portion of the cone below a horizontal plane parallel to configuration centerline 2, and tangent to the cross section at the cone reference station 3. Similarly, the lee-side is formed in part by removing that portion of the cone above a parallel horizontal plane that is also tangent to the cross section at the cone reference station 3. The cone sector angle defining the flat upper surface (as measured from the windward lateral centerline meridian) is initially 180 degrees and decreases with distance aft from the cone reference station 3.

A detail drawing (FIG. 1A shows the aft end forward of the base cross section 5. A particular cone sector angle 6 is chosen to form twin vertical tail surfaces. The vertical tails begin at that body station where the upper flat cone sector angle equals the vertical tail cone sector angle 6. A vertical line dropped from the vertical tail leading edge to the flat upper surface plane completes the lifting body lee-side definition. Primary control is achieved through the employment of the trim angle of attack control ramp 7 cutout from the flat windward surface. A splitter plate 8, separates the ramp into two separate control channels. The preferred method of angle of attack and roll control (not shown) is through the addition of barriers referred to as gates mounted at the base to restrict and separate the flow within the two control channels. This restriction changes the pressures on the ramps and thus produces control forces.

This completes the first step in the derivation of the configuration.

The variables which define a family of vehicles over a range of cone angles are as follows:
1. The cone reference station 3 expressed as a fraction of cone length $1/(\sqrt{2}+1)$.
2. The cone tilt angle 4 expressed as a fraction of the cone half angle [−5/9].
3. The vertical tail cone sector angle 6 [116 deg].
4. The windward control ramp angle expressed as a fraction of the cone half angle 6 [2.25].
5. The height of the base control ramp cutout expressed as a fraction of the cone radius at cone reference station 3 [0.5].

The parameters selected for the preferred embodiment are shown in brackets and are depicted in the figures. These are representative of good packaging efficiency and good lifting body aerodynamic performance (variable 1), acceptable longitudinal and lateral stability (variables 2 and 3), and adequate trim angle of attack control (variables 4 and 5). They result from numerous conceptual design studies covering many applications and extensive wind tunnel tests over the full speed range from subsonic to hypersonic by the Lockheed Missiles and Space Company.

For the reusable space launch vehicle application, the configuration is modified as shown in FIG. 2. The retained Step 1 surfaces include:
The full cone forward of the cone reference station 3.
The flat windward surfaces.
Those cone surfaces aft of the cone reference station 3 between the 90 degree cone sector angle and the vertical tail cone sector angle 6.
The flat lee-side surfaces except for those to the left and right of lines drawn from the flat upper surface-cross section tangency point at the cone reference station 3 to the vertical tail verticles.
The deleted conical surfaces of the Step 1 configuration aft of the cone reference station 3 below the 90 degree cone sector angle are replaced by two surface types. The first surfaces added are Swept cylinder segments 16 with radii identical to the cone radius at the cone reference 3, swept at the angle to match the cone semi-apex angle, and inclined to intersect the base at cross section point 15. Next swept triangular vertical surfaces 14 are added to close the afterbody to the remaining aft conical surfaces.

The short section of the-upper body between the cone reference station 3 and the vertical tail vertices is closed in cross section by variable radii's tangent circular arcs 12 joining the cone at the vertical tail cone sector angle and the flat upper surface.

The final Step 2 (baseline) airframe geometry 20 results. The Step 2 configuration accomplishes the following:
Cylindrical "vee" tankage is much more efficiently integrated within the airframe envelope.
Afterbody windward heat shield files are either flat or of constant radius, thus reducing substantially the number of different tile shapes especially if a constant heat shield thickness is permissible.

FIG. 3 illustrates the propellant tankage configuration. As with the airframe configuration, tankage cross sections are defined perpendicular to the configuration centerline 2. Forward of the cone reference station 3, the tankage is the frustum of a slightly elliptical cone with radius centers on the cone centerline. A forward elliptical dome 31 with 2/1 axis ratio closes the tank forebody. Aft of the cone reference station 3, the tank cross section is defined by three constant radius intersecting circles. Left and right tank segments have their radius centers along lines passing through the radius center at the cone reference station 3 and oriented at the cone half angle while the center tank segment radius center is along the configuration centerline 2. The three tank cylinder segment centerlines all lie in the same plane. The aft tank is closed off with three 2/1 ellipse intersecting domes.

FIG. 4 shows typical tank-airframe cross sections within the airframe outline. Clearance between the tank and airframe cross sections result from a representative 6 percent difference between the tank radius and the airframe radius at the cone reference station 3. For a 15-foot tank diameter, the minimum clearance would be 4.5 inches. The tank-airframe configuration illustrated is representative of the arrangement for a manned reusable space launch vehicle (15–16-foot tank diameter at the cone reference station). Ahead of the forward tank dome there is sufficient volume for vehicle subsystems and a crew compartment similar in size to the Gemini spacecraft. Aft of the rear tank domes, there is space for a single Space Shuttle Main Engine (SSME). Location and arrangement of the liquid oxygen tank, the payload bay and the landing gear (all want to be at or near the flight center of gravity) are subject to designer optimization. Since liquid oxygen (LOX) dominates the launch gross while liquid hydrogen dominates the tank volume, the preferred approach includes split fore and aft hydrogen tanks and a LOX tank surrounding the center of gravity. The payload bay and landing gear wells can then be integrated into the LOX tank design.

Referring next to FIG. 5, a modification to the propellant tank is illustrated to increase propellant capacity with only minor changes to airframe lee-side geometry. In this case, the constant tank radius is not equal to the value and does not originate at the cone reference station 3, but at some station aft (initial constant radius station 51) set by the ratio the tank cylinder radius to the tank radius at the cone reference station 3. A transition section occurs between cone reference station 3 and initial constant radius tank station 51. The tank cross section is still described by three constant radius circular segments but in this case, the radius varies linearly from the tank radius at cone reference station 3 to the constant radius value at tank station 51. The tank radius centerlies 52 break at initial constant radius station 51.

FIG. 6 illustrates changes to the tank/airframe cross sections for a representative 10 percent increase of the constant propellant tank radius over the tank radius at cone reference station 3. The lee-side surfaces aft of cone reference station 3, forward of the vertical tail vertices and above the vertical tail cone sector angle 6, and the horizontal flat surfaces are modified to accommodate the increased tank dimensions. Between cone reference station 3 and initial constant radius station 51, the upper surface centerline follows the forebody lee-side upper surface slope. From constant radius station 51 to final constant tank radius cross section 63, the airframe lee-side meridian surface is parallel to the configuration centerline 2. Aft of final constant tank radius cross section 63, the airframe upper surface centerline follows a constant negative slope to the base value. The lee-side flat surfaces extend laterally to intersections with the vertical planes passing through the outboard lines of tank radius centers. Forward of the vertical tail vertices, the revised cross section between the flat upper surface and the vertical tail cone sector angle is described by two circular arcs tangent to each other and the matching surfaces. Aft of the vertical tail vertices, the cross section is closed by single circular arcs tangent to flat upper surface and intersecting at the unchanged inner vertical tail flat lee-side surface juncture.

This completes the description of the primary options of the subject invention and illustrates graphically the integration of large volume, efficient, potentially light weight propellant tankage into a lifting body configuration sufficient for the reusable space launch vehicle application. While the configuration defining parameters listed and depicted in the drawings for the Step 1 configuration produced a workable solution as indicated by wind tunnel tests and analysis, further optimization is warranted for an operational system. While not supported by wind tunnel test results, the geometry changes in providing the baseline Step 2 configuration should produce minor but improved aerodynamic properties. The lower Mach number aerodynamics (M<7) are much more sensitive to lee-side shape changes because of the powerful expansion suction pressure behind the break in slope aft of the forecone. Thus, tankage cylinder increases much greater than the 10 percent increase in radius illustrated in FIG. 5 and FIG. 6 may be of limited value. Not included in the drawings but potential options are a lee-side base flap, termination of the lee-side surface forward of the base but behind the tankage, and slots or inlets. These would provide greater control of Mach number effects on trim angle of attack and reduce subsonic base drag.

While the configuration concept has been tailored to the reusable space launch vehicle application, the invention has application to any hypersonic vehicle requiring atmospheric maneuvering with or without on-board propulsion.

What is claimed is the following for the subject invention:

1. A spacecraft including:
a spacecraft body centerline;
a forebody conical portion;
said forebody conical portion including a forebody conical centerline;
an afterbody portion;
said forebody portion being conically shaped and having radii which vary linearly with length;
said afterbody portion having side surfaces, an upper planar surface and a lower planar surface;
said afterbody side surfaces being a continuation of said forebody conical portion; said afterbody upper and lower planar surfaces being in parallel planes;
a vertical tail section, said vertical tail section being positioned aft of the center of gravity of said spacecraft, said vertical tail section being defined by said conical side surfaces in the afterbody portion of the spacecraft; said vertical tail section extending above said planar upper surface of the afterbody;
and wherein said forebody conical portion of said spacecraft is tilted with respect to said afterbody portion, such that the centerline of said spacecraft is below said conical forebody centerline, in the afterbody portion of the spacecraft.

2. A spacecraft including:
a spacecraft body centerline;
a forebody conical portion;
said forebody conical portion including a forebody conical centerline;
an afterbody portion;
said forebody portion being conically shaped and having radii which vary linearly with length;
said afterbody portion having side surfaces, an upper planar surface and a lower planar surface;
said afterbody side surfaces being a continuation of said forebody conical portion; said afterbody upper and lower planar surfaces being in parallel planes;
a vertical tail section, said vertical tail section being positioned aft of the center of gravity of said spacecraft, said vertical tail section being defined by said conical side surfaces in the afterbody portion of the spacecraft; said vertical tail section extending above said planar upper surface of the afterbody; and wherein said afterbody lower surface lies in a horizontal plane parallel to said lifting body shape centerline and tangent to a forebody lower surface cross section; said lower surface creating a positive pitching moment which is generated by a cutout of the lower planar surface, said cutout originating forward of the spacecraft aft end and continuing to the aft end of the spacecraft;
and wherein said forebody conical portion of said spacecraft is tilted with respect to said afterbody portion, such that the centerline of said spacecraft is below said conical forebody centerline, in the afterbody portion of the spacecraft.

3. A spacecraft including:
a spacecraft body centerline;
a forebody conical portion;
said forebody conical portion including a forebody conical centerline;
an afterbody portion;
said forebody portion being conically shaped and having radii which vary linearly with length;
said afterbody portion having side surfaces, an upper planar surface and a lower planar surface;
said afterbody side surfaces being a continuation of said forebody conical portion; said side surfaces being segmented into three sections, wherein the first section is a conical upper section extending above the upper planar surface of the afterbody, a second flat surface which extends below the first section and a third constant radius circular arc section which extends below the second section and forms an intersection with the lower planar surface of the afterbody portion; said afterbody upper and lower planar surfaces being in parallel planes;

a vertical tail section, said vertical tail section being positioned aft of the center of gravity of said spacecraft, said vertical tail section being defined by said conical side surfaces in the afterbody portion of the spacecraft; said vertical tail section extending above said planar upper surface of the afterbody;

and wherein said forebody conical portion of said spacecraft is tilted with respect to said afterbody portion, such that the centerline of said spacecraft is below said conical forebody centerline, in the afterbody portion of the spacecraft.

4. The spacecraft as recited in claim 1 wherein said forebody conical portion is a slightly blunted elliptic cone.

5. The spacecraft as recited in claim 1 wherein the left and right sides of said spacecraft are symmetrical about a vertical plane passing through said spacecraft centerline.

6. The spacecraft as recited in claim 1 wherein said forebody cross-sections which are perpendicular to said spacecraft centerline are full circles.

7. The spacecraft as recited in claim 1 wherein the afterbody portion has a length which is 50 percent or greater in length than the length of the forebody portion of the spacecraft.

8. The spacecraft as recited in claim 1 wherein said afterbody lower surface lies in a plane parallel to said spacecraft centerline and tangent to a forebody lower surface cross-section at its base.

9. The spacecraft as recited in claim 1 wherein the spacecraft includes cone surface rays, and the afterbody portion includes extensions of said conical forebody contained between the cone surface rays tangent to vertical planes, and the cone surface which intersect a horizontal plane which is tangent to the upper surface cross-section of the forebody aft end at at least two thirds of the spacecraft's length as measured from a forebody apex.

10. The spacecraft as recited in claim 9 wherein said vertical tail section includes a chord line which is defined by an inward displacement relative to said cone extension rays of vertical planar surfaces which intersect at a juncture with a horizontal plane which is tangent to the upper surface cross-section of the forebody's aft end.

11. The spacecraft as recited in claim 10 wherein said forebody includes a base radius which is defined by the radius at the aft end of said forebody, and the afterbody lower side cross-sections are defined by constant radius circular arc segments which have a radius which is equal to said conical forebody base radius.

12. The spacecraft as recited in claim 11 wherein a portion of the afterbody between lower conical extension rays and lower side constant radius segments are closed by tangent planar vertical surfaces.

13. The spacecraft as recited in claim 12 wherein a portion of the afterbody upper surface inboard of said vertical tail section lies in a horizontal plane that is displaced vertically from said spacecraft centerline a distance greater than said forebody base radius, said afterbody planar upper surface width being greater than the difference between an afterbody cross-section width and an afterbody cross-sectional height.

14. The spacecraft as recited in claim 13 wherein a forward flat upper surface is inclined at an angle which is the same as that of the forebody upper surface, the forward flat upper surface originating at the front of the afterbody and terminating at the intersection with the afterbody horizontal plane upper surface, wherein the forward flat upper surface extends laterally a distance greater than the difference between an afterbody cross-section width and an afterbody cross-section height.

15. The spacecraft as recited in claim 14 wherein the afterbody flat upper surface follows a negative slope to the intersection at the afterbody base with a horizontal plane which is tangent to the upper surface cross-section of said forebody aft section.

16. The spacecraft as recited in claim 15 wherein the afterbody upper left and right side surfaces cross-sections forward of the vertical tail section vertices are closed by two circular arcs tangent to each other and tangent to the corresponding upper flat and lower conical surfaces at their end points.

17. The spacecraft as recited in claim 3 wherein said cutout includes planar surfaces which are at a positive slope relative to a horizontal tangential line which is formed with the lower planar afterbody surface of the spacecraft.

18. The spacecraft as recited in claim 17 wherein said cutout includes a splitter plate which divides the cutout section into two separate planar channels.

19. The spacecraft as recited in claim 18 wherein the vertical tail section includes a root portion and wherein the afterbody upper left and right side surfaces cross-section, aft of the vertical tail section vertices, are each closed by a single circular arc tangent to the flat upper surface which intersect with the vertical tail section at the root of the vertical tail section.

* * * * *